(12) United States Patent
Shiratani

(10) Patent No.: US 6,950,554 B2
(45) Date of Patent: Sep. 27, 2005

(54) LEARNING TYPE IMAGE CLASSIFICATION APPARATUS, METHOD THEREOF AND PROCESSING RECORDING MEDIUM ON WHICH PROCESSING PROGRAM IS RECORDED

(75) Inventor: Fumiyuki Shiratani, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 656 days.

(21) Appl. No.: 09/897,221

(22) Filed: Jul. 2, 2001

(65) Prior Publication Data

US 2002/0012467 A1 Jan. 31, 2002

(30) Foreign Application Priority Data

Jul. 18, 2000 (JP) ........................................ 2000-217720

(51) Int. Cl.[7] .................................................. G06K 9/62
(52) U.S. Cl. ...................... 382/224; 382/156; 382/165; 382/173; 706/15
(58) Field of Search ................................ 382/155–159, 382/170, 173, 190–193, 195, 197, 199, 181, 118, 128, 115, 117, 180, 224, 203, 209, 282, 217–219, 291, 283, 165, 305, 164; 707/102–104.1, 1–8; 706/15, 20, 18, 126, 21, 903

(56) References Cited

U.S. PATENT DOCUMENTS

| 5,144,683 | A | * | 9/1992 | Suzuki et al. | 382/203 |
| 5,754,676 | A | * | 5/1998 | Komiya et al. | 382/132 |
| 5,832,183 | A | * | 11/1998 | Shinohara et al. | 706/20 |
| 6,208,758 | B1 | * | 3/2001 | Ono et al. | 382/190 |
| 6,549,660 | B1 | * | 4/2003 | Lipson et al. | 382/224 |
| 6,574,378 | B1 | * | 6/2003 | Lim | 382/305 |

FOREIGN PATENT DOCUMENTS

| JP | 8-249349 | 9/1996 |
| JP | 9-101970 | 4/1997 |
| JP | 10-49542 | 2/1998 |
| JP | 10-55366 | 2/1998 |
| JP | 11-328422 | 11/1999 |

* cited by examiner

Primary Examiner—Kanjibhai Patel
Assistant Examiner—Ali Bayat
(74) Attorney, Agent, or Firm—Frishauf, Holtz, Goodman & Chick, P.C.

(57) ABSTRACT

A learning type image classification apparatus is capable of classifying a plurality of images flexibly. A region clipping mode selection section is capable of selecting a mode of clipping regions from images from a plurality of candidates. The region clipping execution section clips regions from images in a mode selected by the selection section of the region clipping mode.

22 Claims, 6 Drawing Sheets

LEARNING TYPE IMAGE CLASSIFICATION APPARATUS, METHOD THEREOF AND PROCESSING RECORDING MEDIUM ON WHICH PROCESSING PROGRAM IS RECORDED

CROSS-REFERENCE TO RELATED APPLICATIONS

This application is based upon and claims the benefit of priority from the prior Japanese Patent Application No. 2000-217720, filed Jul. 18, 2000, the entire contents of which are incorporated herein by reference.

BACKGROUND OF THE INVENTION

1. Field of the Invention

A large quantity of labor is required in the work of manually classifying and putting in order an infinite number of images present in the database, in the computer, or on the network and of attaching key words for retrieval with hands.

2. Description of the Related Art

Therefore, there are proposed an automatic image classification apparatus and an apparatus of automatically adding keywords for image retrieval.

As an example of the automatic image classification apparatus, there is available Jpn. Pat. Appln. KOKAI Publication No. 11-328422. Furthermore, an apparatus of automatically adding key words for retrieval, there are available Jpn. Pat. Appln. KOKAI Publication No. 8-249349, Jpn. Pat. Appln. KOKAI Publication No. 10-49542, and Jpn. Pat. Appln. KOKAI Publication No. 10-55366 and the like.

In the beginning, in Jpn. Pat. Appln. KOKAI Publication No. 11-328442, there is proposed an apparatus of automatically classifying, for example, natural images and artificial images by using features extracted from images by sampling.

Although there is a possibility that this apparatus which is capable of classifying images functions well depending upon the features distributed uniformly over the whole image, but the apparatus is not sufficient for classifying objects locally present in images.

That is, it is necessary to devise means for clipping only object regions in order to classify objects.

Such devise is introduced in Jpn. Pat. Appln. KOKAI Publication No. 8-249349, Jpn. Pat. Appln. KOKAI Publication No. 10-49542 and Jpn. Pat. Appln. KOKAI Publication No. 10-55366.

In Jpn. Pat. Appln. KOKAI Publication No. 10-49542, there is proposed that a region is divided by using a change in color or luminance in images in the beginning, and the feature of each of the divided regions is extracted, followed by analyzing a topological relationship between regions and referring to a dictionary so that the key words for retrieval is automatically added to images.

Furthermore, in Jpn. Pat. Appln. KOKAI Publication No. 8-249349, Jpn. Pat. Appln. KOKAI Publication No. 10-55366, there is proposed an apparatus of dividing an image into regions by using a change in color or luminance in images, subjecting divided regions to integration processing to transform the regions into a concept of an upper layer so that a high degree of key word is automatically added to the image as a key word.

These apparatuses are intended to automatically add key words on the basis of features of an object in the images, and the apparatuses use a knowledge dictionary such that a blue sky is disposed at an upper section of the image and has a blue color, or the like.

Consequently, there remains a problem such that how a parameter value for classification should be set in the case where classification which is not seen in knowledge dictionary is desired.

As means for coping with any circumstances, there is available a classification apparatus provided with a supervised learning. As such example, there is available Jpn. Pat. Appln. KOKAI Publication No. 11-34450.

Hereinafter, a conventional example shown in Jpn. Pat. Appln. KOKAI Publication No. 11-34450 will be explained in detail for some time.

Figure 6:
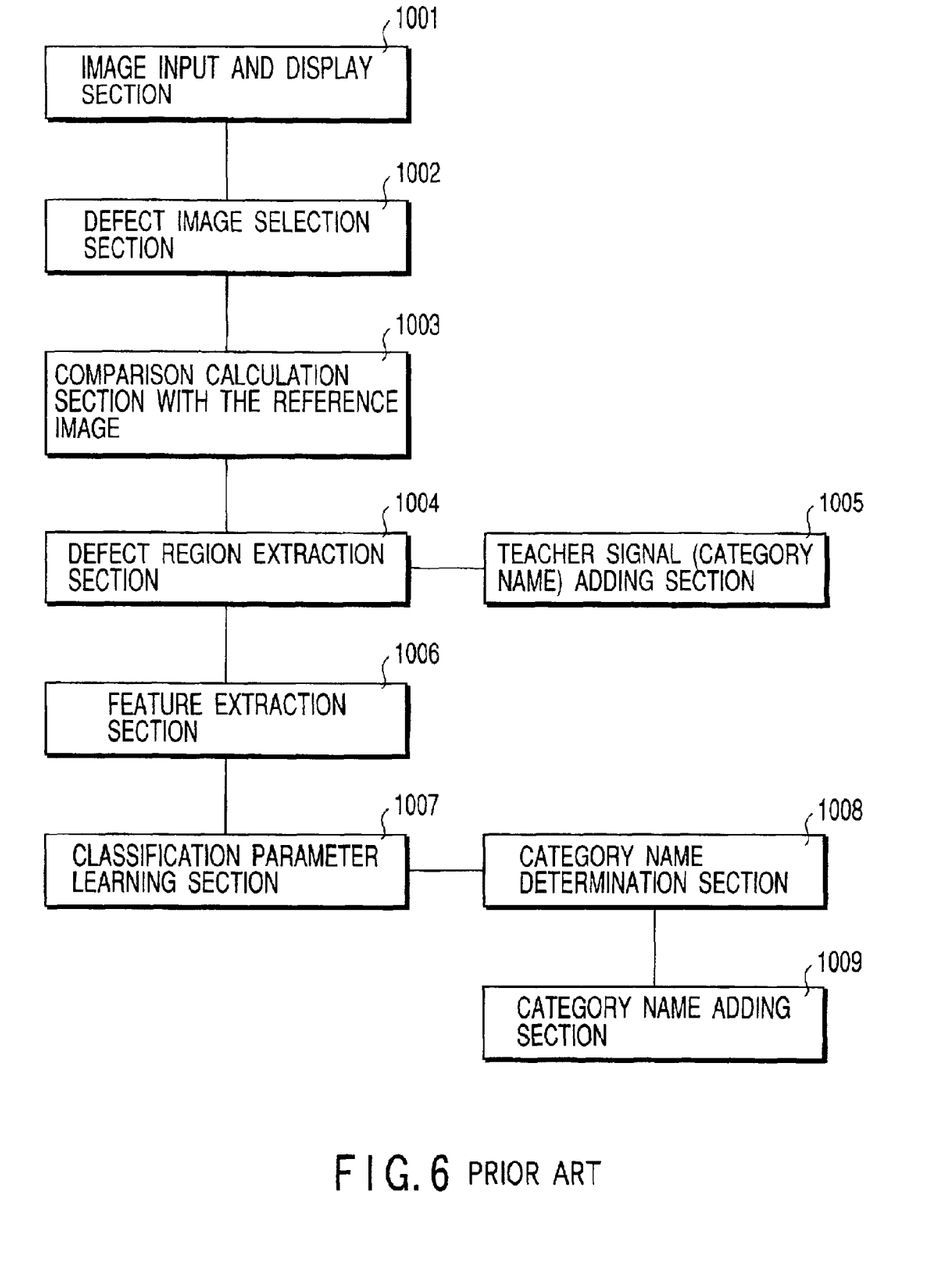
FIG. 6 is a block diagram showing one example of the conventional image classification apparatus provided with a supervised learning.

FIG. 6 is a block diagram showing one example of a conventional classification apparatus provided with a supervised learning.

In FIG. 6, reference numeral 1001 denotes an image input and display section for inputting and displaying, for example, a wafer image.

Furthermore, reference numeral 1002 denotes a defect image selection section with which an operator monitors a displayed image and selects a defect image.

Furthermore, reference numeral 1003 denotes a calculation section for comparison with a reference image for calculating a difference from the reference image.

Furthermore, reference numeral 1004 denotes a defect region extraction section for conducting a threshold value processing associated with the calculation result of the calculation section for comparison with the reference image to extract a defect image.

Furthermore, reference numeral 1005 denotes a teacher signal (category signal) adding section for adding a category name which is a teacher signal at the learning step.

Then, reference numeral 1006 denotes a feature extraction section for extracting features of the extracted defect region.

Furthermore, reference numeral 1007 denotes a classification parameter learning section for conducting learning of the classification parameter so that the learning data of the attached with a teacher signal is well classified.

Furthermore, reference numeral 1008 denotes a category determination section for determining which of the category the defect region belongs to.

Furthermore, reference numeral 1009 denotes a category name adding section for adding a determined category name to the defect image.

Next, an operation thereof will be explained.

Figure 7A:
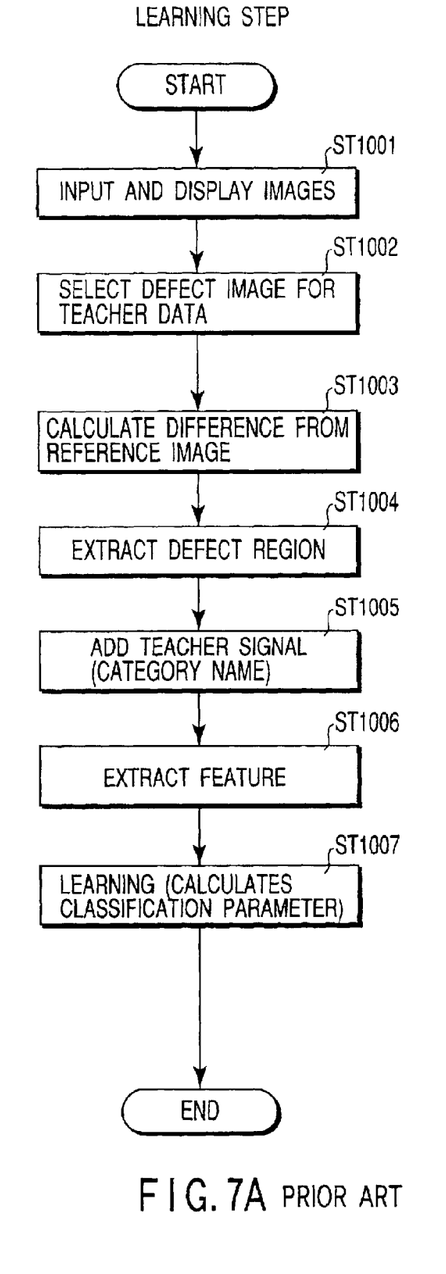
FIGS. 7A and 7B are flowcharts shown for explaining an operation of the conventional image classification apparatus provided with a supervised learning.
Figure 7B:
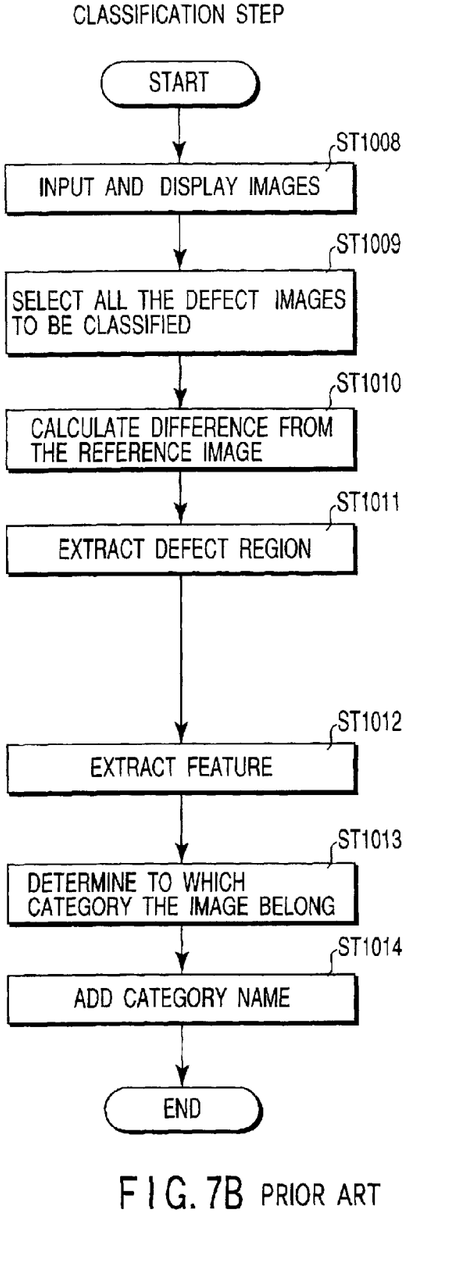

FIGS. 7A and 7B are flowcharts shown for explaining an operation of a conventional classification apparatus provided with a supervised learning.

At first, the flow of the learning step will be explained.

In the beginning, at the image input and display section 1001, for example, a wafer image is input and displayed (step ST 1001).

Next, at the defect image selection section, an operator selects a defect image for the training data (step ST1002).

Subsequently, at the calculation section 1003 for comparison with the reference image, a difference between the selected defect image and the reference image is calculated (step ST1003).

This calculation result is subjected to the threshold value processing at the defect region extraction section 1004 to extract the defect region (step ST1004).

The operator adds the category name which is a teacher signal to the defect region at the teacher signal (category name) adding section 1005.

Next, at the feature extraction section 1006, the features is extracted from the extracted defect region at the feature defect section 1006.

Subsequently, at the classification parameter learning section 1007, the classification parameter is learned so that the learning data attached with the teacher signal so that the learning data attached with the teacher signal is well classified (step ST1007).

Thus, the learning step is completed.

Next, the classification step will be explained.

A rough flow of the learning step is approximately the same as the learning step, so that only different processing section will be explained.

In the beginning, at the learning step, the defect image for training data is selected. However, at the classification step, all the classification object images become an object (step ST1009).

Furthermore, naturally, it is not required to add the teacher signal.

Instead, a category determination is made to determine which of the category the signal belongs to (step ST1013). The classification step will be completed by adding the name of the category (step ST1014).

As shown above, an example of the classification apparatus provided with the supervised learning has been explained according to Jpn. Pat. Appln. KOKAI Publication No. 11-34450.

By the way, Jpn. Pat. Appln. KOKAI Publication No. 11-34450 discloses a proposal on a defect classification apparatus in a defect inspection of a semiconductor wafer or the like.

Consequently, such defect classification apparatus is capable of detecting the position of defects from a difference between images with defects and reference images. In the case where an object region such as general images without any reference images is classified, it is extremely difficult to detect only regions to be classified.

However, since the device for automatically adding key words for image retrieval, and an automatic image classification apparatus are constituted in the above manner, so that the detection of the classification target region becomes a large issue.

As one method of detecting the classification target region, there is available a method of selecting and discarding and integrating each region which is divided by referring to the knowledge dictionary. In the case where it is desired to make a classification which cannot be found in the knowledge dictionary, there remain a problem as to how the value of the classification parameter value can be set.

A learning type classification apparatus can solve this problem, and can store what is learned as knowledge.

A structure of the classification apparatus provided with a supervised learning according Jpn. Pat. Appln. KOKAI Publication No. 11-34450 is convenient for inspecting a deviation from the reference image. However, it is extremely difficult to clip classification target region at the learning phase from general images.

As a consequence, work is considered to manually clip classification target region steadily at learning phase. However, such work is not preferable because a large quantity of labor is required.

BRIEF SUMMARY OF THE INVENTION

An object of the present invention is to provide a learning type image classification apparatus which is capable of clipping classification target region at the learning phase, or alleviating the burden of work such as instruction for classification target region or the like and a method thereof, and a recording medium on which the processing program is recorded.

In order to achieve the above object, according to the present invention, there is provided (1) a learning type image classification apparatus which is capable of classifying a plurality of images on a predetermined reference, the apparatus comprising:

region clipping mode selection section which is capable of selecting a mode of clipping from the images a region out of a plurality of candidates; and region clipping execution section for clipping regions from the images in a mode selected with the selection section in the region clipping mode.

According to the present invention, in order to achieve the above object, there is provided (2) the learning type image classification apparatus according to (1), wherein the apparatus is operated at least at the learning step and at the classification step after learning, and the region clipping mode selection section and the region clipping execution section are operated at the above learning step.

Furthermore, according to the present invention, in order to achieve the above object there is provided (3) the learning type image classification apparatus according to (1), wherein the candidates of image clipping mode include a mode of automatically dividing the image into a plurality of regions by using a change in color and luminance value and clipping from images a region obtained by integrating regions selected from a plurality of these divided regions.

Furthermore, according to the present invention, in order to achieve there is provided (4) the learning type image classification apparatus according to (1), wherein the candidates of the mode of clipping regions include a mode of clipping the region by using a category which has been learned.

Furthermore, according to the present invention, in order to achieve the above object, there is provided (5) the learning type image classification apparatus according to claim 4, wherein the mode of clipping the region judges the reliability of the region clipped by using the learned category.

Furthermore, according to the present invention, in order to achieve the above object, there is provided (6) the learning type image classification apparatus according to (4), wherein the mode of clipping the region counts the number of clipped regions by using the learned category, and the image having a region number of 1 is extracted as a learning image.

Furthermore, according to the present invention, in order to achieve the above object, there is provided (7) the learning type image classification apparatus according to (4), wherein the region clipping mode displays the result of the region clipping and the operator can have an option as to whether the result of the region clipping is to be adopted.

Furthermore, according to the present invention, in order to achieve the above object, there is provided (8) A learning type image classification method which is capable of classifying a plurality of images on a predetermined reference, the method comprising the steps of:

selecting a mode of clipping a region from the images from a plurality of candidates; and clipping a region from images in the selected mode.

Furthermore, according to the present invention, in order to achieve the above object, there is provided (9) a recording medium in which a processing program is recorded for classifying a plurality of images on a predetermined reference with a computer, the processing program comprising:

a first program providing a computer with a mode of clipping a region from images selected from a plurality of candidates; and a second program allowing the computer to clip a region from the images in the above clipping mode;

wherein the first program and the second program constitute a learning type image classification program.

Furthermore, according to the present invention, in order to achieve the above object, there is provided (10) a learning type image classification apparatus provide with a learning step and a classification step after learning for classifying a plurality of images or automatically adding a key word for retrieval to images, the apparatus comprising:

a learning step execution section for executing the learning step;

a classification step execution section after learning for executing the classification step after learning; and a region clipping mode selection section provided with a plurality of region clipping modes, the section being capable of selecting several modes out of the plurality of the modes.

Furthermore, according to the present invention, in order to achieve the above object, there is provided (11) the image classification apparatus according to claim 10, wherein the region clipping mode comprises a semi-automatic region clipping mode, a learning usage region clipping mode, and a interactive type region clipping mode.

Furthermore, according to the present invention, in order to achieve the above object, there is provided (12) the learning type image classification apparatus according to claim 11, wherein the semi-automatic region clipping mode comprises a region dividing section for automatically dividing the image into several regions by using the change in the color and luminance in the image;

a region designation section which is capable of designating a classification target region out of the regions divided at the region dividing section; and a region integration section for integrating the region designated with the region designation section to set the region as the clipped region.

Furthermore, according to the present invention, in order to achieve the above object, there is provided (13) the learning type image classification apparatus according to (11), wherein the learning usage region clipping mode comprises:

a section for defining a region relationship between a category which has been learned and a category which is being learned; and a region clipping execution section by the category which has been learned for executing the region clipping by the category which has been learned.

Furthermore, according to the present invention, in order to achieve the above object, there is provided (14) the learning type image classification apparatus according to claim 11, wherein the interactive type region clipping mode comprises:

a section for defining a region relationship between categories for defining a region relationship between the category which has been learned and the category which is being learned;

a region clipping execution section by the category which has been learned for executing region clipping by the category which has been learned;

a region clipping result display section; and a judging section for judging the adoption of the region clipping.

Furthermore, according to the present invention, in order to achieve the above object, there is provided (15) the image classification apparatus according to claim 11, wherein, the learning usage region clipping mode further comprises a region clipping reliability judging section for judging the reliability of a region clipping wherein the system judges the reliability of the region clipped by the category which has been learned.

Furthermore, according to the present invention, in order to achieve the above object, there is provided (16) the image classification apparatus according to claim 11, wherein the learning usage clipping mode further comprises:

a region number counting section for counting the number of regions of the result of the region clipped by the category which has been learned; and a learning image candidate selection section in which an image in which the number of regions is counted 1 is set as a candidate of the learning image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Embodiments of the present invention will be explained by referring to the drawings hereinbelow.

(First Embodiment)

Figure 1:
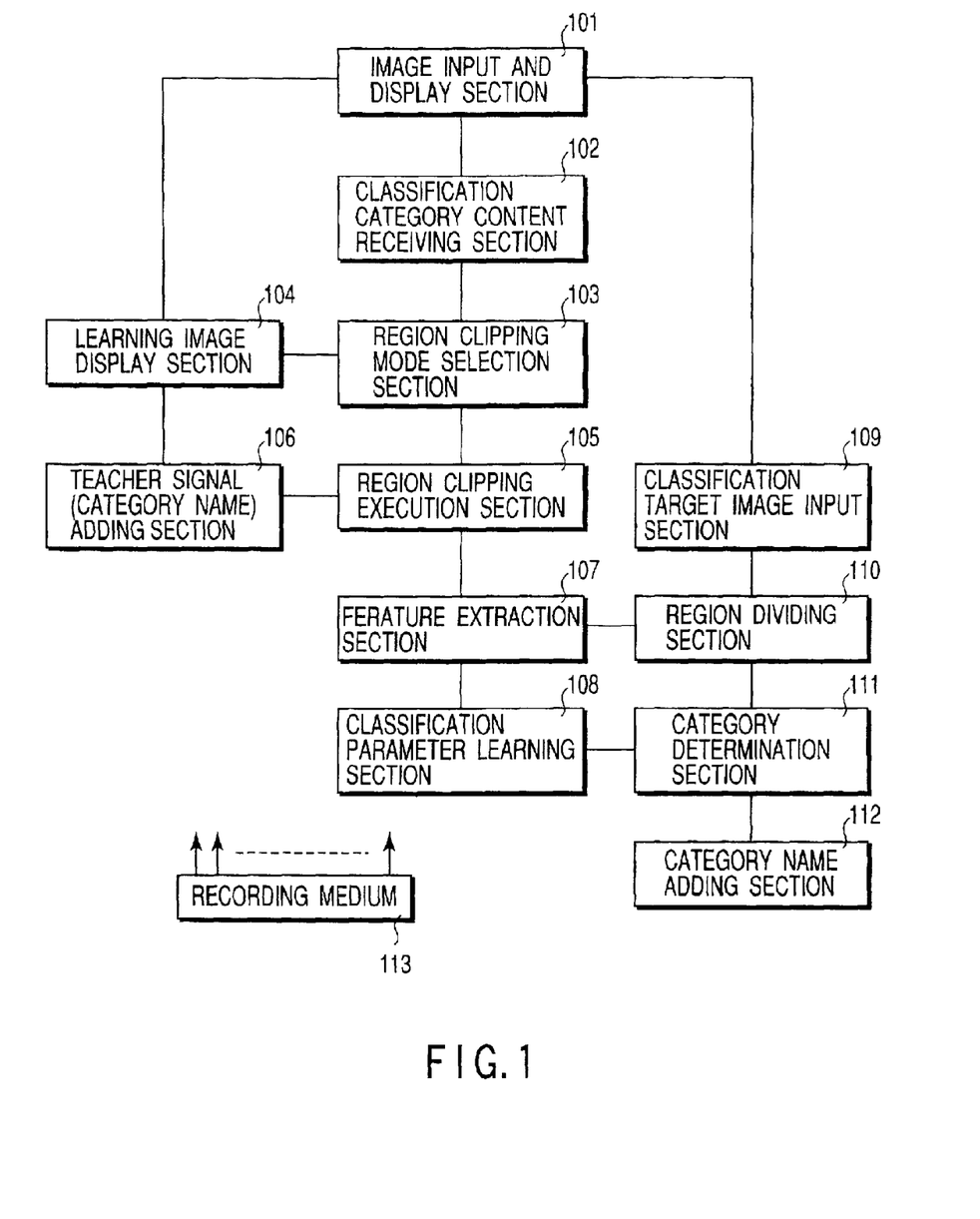
FIG. 1 is a block diagram showing a structure of a learning type image classification apparatus according to a first embodiment of the present invention.

FIG. 1 is a block diagram showing a structure of a first embodiment including a learning type image classification apparatus, a learning type image classification method and a recording medium on which a learning type image classification program is recorded.

In FIG. 1, reference numeral 101 denotes an image input and display section.

Furthermore, reference numeral 102 denotes a classification category content receiving section for allowing the system to receive which type of classification category is made.

Furthermore, reference numeral 103 denotes a region clipping selection section for selecting the mode in which the user or the system conducts the clipping processing of the region corresponding to the category in the image.

Furthermore, reference numeral 104 denotes a learning type image selection section used at the time of category learning.

Furthermore, reference numeral 105 denotes a region clipping execution section for clipping a region corresponding to the category from images in any of the modes selected at the region clipping mode selection section 103.

Furthermore, reference numeral 106 denotes a teacher name (category name) adding section for giving in set a category name which becomes a label of classification category.

Furthermore, reference numeral 107 denotes a feature extraction section for extracting features representing the feature of the clipped region which is extracted.

Furthermore, reference numeral 108 denotes a learning section of a classification parameter for adjusting parameters in the system so that the set of feature data can be classified on the basis of the teacher signal.

Furthermore, reference numeral 109 denotes a classification object image input section for inputting images which are desired to be classified after learning.

Furthermore, reference numeral 110 denotes a region dividing section for dividing images input after learning into several regions.

Furthermore, reference numeral 111 denotes a category determination section for determining the category of images input after learning.

Furthermore, reference numeral 112 denotes a category name adding section for adding a determined category name to an image or a region.

Furthermore, reference numeral 113 denotes a recording medium in which there are recorded a first program for providing with a computer a mode of clipping a region from selected images from a plurality of candidates and a second program for clipping a region from among the image in the clipping mode to the above computer.

Next, an operation of the apparatus will be explained.

Figure 2A:
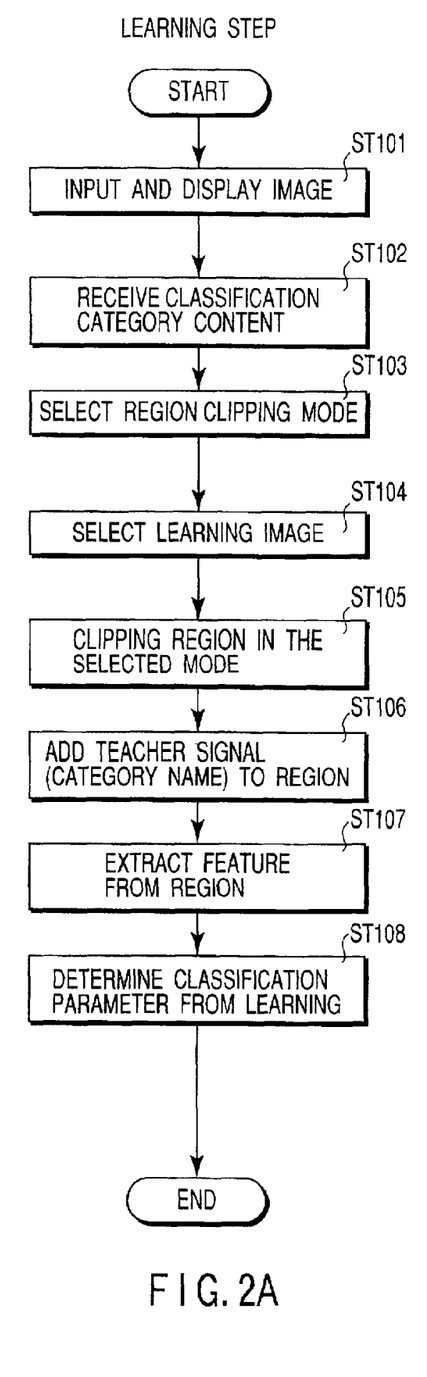
FIGS. 2A and 2B are flowcharts shown for explaining an operation of the learning type image classification apparatus according to the first embodiment of the present invention.
Figure 2B:
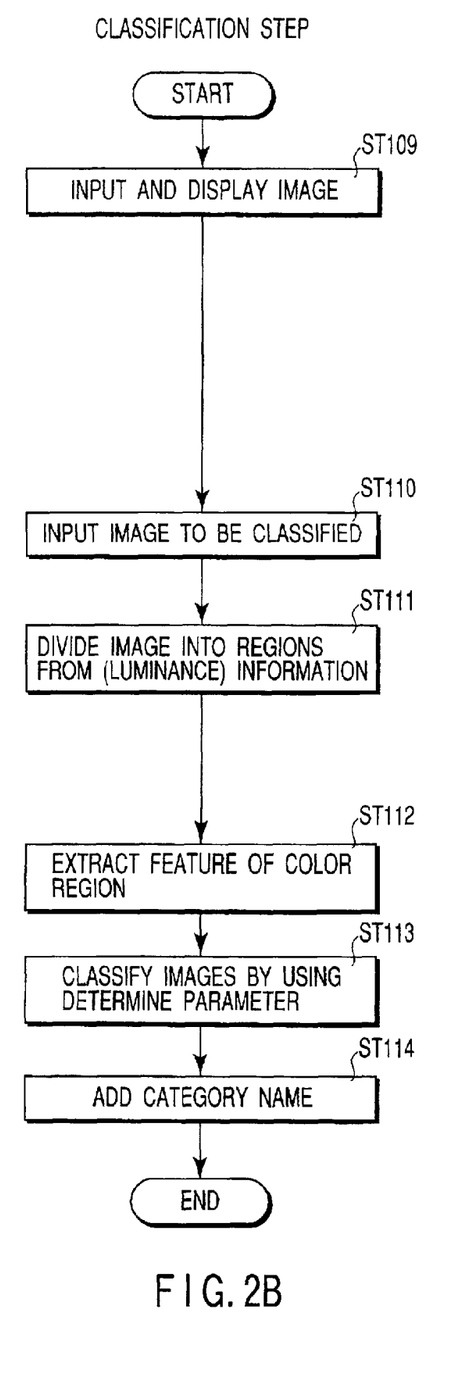

FIGS. 2A and 2B are flowcharts shown for explaining a first embodiment including a learning type image classification device and a learning type image classification method and a recording medium in which the learning type image classification method is recorded.

In the beginning, the learning step will be explained.

At the outset, at the image input and display section 101, the image is input to this device or the system and the image is displayed on the screen (step ST101).

Next, the user determines how the user desires to classify the images while watching the image group displayed on the screen and notifies the content to the system at the classification category content receiving section 102 (step ST102).

Specifically, the system assumes a certain degree of classification need, or allows the user to select the need from among the options such as, for example, it is desired that human face images are classified apart from other images, or it is desired that face images on an individual level are dealt with.

Next, the region clipping mode selection section 103 makes a selection as to in what mode a region corresponding to the category is clipped from the image (step ST103).

As types of region clipping modes, there are available, for example, a semi-automatic region clipping mode, a learning usage region clipping mode, a interactive type clipping mode and the like.

Figure 3A:
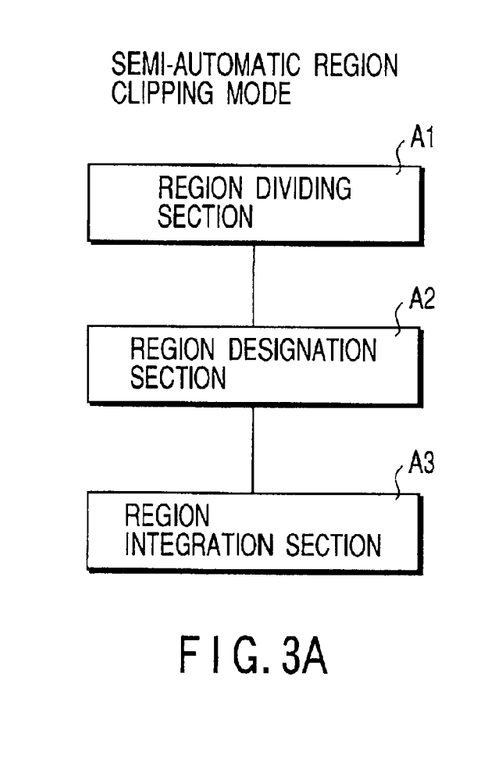
FIGS. 3A, 3B and 3C are views shown for explaining as types of region clipping modes of FIGS. 2A and 2B three modes; a semi-automatic clipping mode, a learning usage region clipping mode, and a interactive type region clipping mode.
Figure 3B:
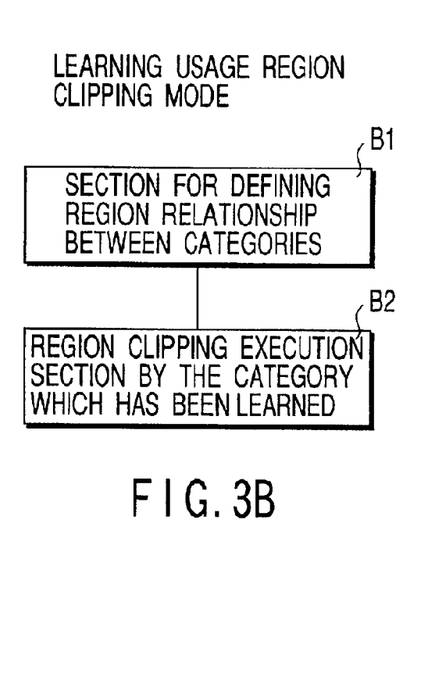
Figure 3C:
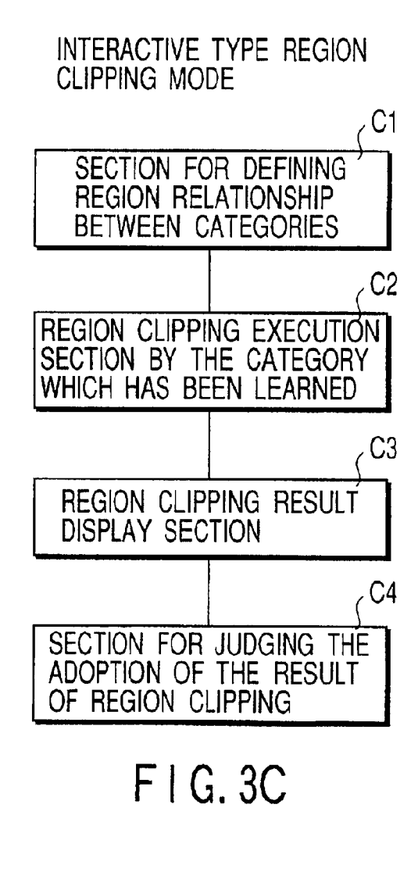

Hereinafter the three modes will be explained by using three FIGS. 3A, 3B and 3C.

At the outset, there will be explained a semi-automatic region clipping mode shown in FIG. 3A.

In the beginning, the system automatically divides input image into regions by making use of the change in color and in luminance values.

Subsequently, at the region instruction section A2, some of the regions divided are clicked by men.

Consequently, at the region integration section 3A, the system integrates and processes these regions and adopts the integrated region as the result of the clipping of the regions.

Next, there will be explained a mode of learning usage clipping mode shown in FIG. 3B.

This is a one touch style region clipping mode which does not allow users to be conscious of the clipping of regions. There are several limitations in the usage of this mode.

That is, this is a method of attributing the clipping of the regions of categories to be classified from now on to the detection of regions of the category which has been learned.

For this purpose, in the section B1 of defining a region relationship between categories, the relationship between regions with the category to be learned are given to, for example, to the dictionary as knowledge.

Then, in the case where the relationship between regions agrees with each other, it is possible to attribute the clipping of the category region to be learned to the clipping of the region of the category which has learned.

For example, when learning is conducted which allows differentiation of human face images and other images, human face images are clipped by using parameters which have been learned to add category names of the individual's names to the clipped regions at the region clipping execution section B2 by the category which has been learned in the case where classification is made which allows differentiation of images on the individual level.

When this mode is used, the user is not required to consciously conduct troublesome region clipping processing only by collecting images for learning and giving a teacher signal.

Thirdly, there will be explained a interactive type region clipping mode shown in FIG. 3C.

This is a method for displaying the result of the clipping of the face region explained in the learning usage region clipping mode and selecting and discarding images used in learning by the user's confirmation of the region detection ratio in the clipping result at the region clipping result adoption judgment section C4.

Then, returning to FIGS. 2A and 2B, after the region clipping mode is selected, the learning image selection section 104 allows the user to select a learning image (step ST104) and the region clipping execution section 105 clips the classification target region from among the images in the style of respective modes (step ST105).

Next, in the teacher signal (category name) adding section 106, the classification category names such as faces and forehead or the like are given in sets to the image or the clipped region in set (step ST106).

Next, in the feature extraction section 107 extracts the feature such as color, shape texture or the like from the designated region (step ST107).

After that, at the classification parameter learning section 108, a feature vector is prepared from the extracted feature and a classification parameter is learned and determined so that the feature parameter can be classified in accordance with the teacher signal (step ST108).

At this time, processing such as overlapping the feature in accordance with an effective degree for classification (for example, Jpn. Pat. Appln. KOKAI Publication No. 9-101970) may be used.

Incidentally, as a result of the learning of the classification parameter, for example, at a kohonen type neural net, the neuron element corresponds to a representative vector in the vector quantization so that the neuron element is set in a state in which a label representing the classification category name is added to this representative vector.

By the way, the learning is thus completed, and now the process proceeds to the classification so that the process now proceeds to the classification step.

In the beginning, the image input and display section inputs or displays a group of images (step ST109).

Next, at the classification target image input section 109, the image which is desired to be classified is input (step ST110).

After that, at the region dividing section 110, the region is divided by using the change in color and in luminance value (step ST111).

Furthermore, at the feature extraction section 107, the feature such as color, shape, texture and the like is extracted from each of the divided regions (step ST112).

Next, at the classification parameter learning section 108, the feature vector is generated from the set of feature obtained in each region 108.

Next, the feature vector of each region is classified by using a classification parameter which has been learned and the category determination section 111 determines to which category the region belongs (step ST113).

Lastly, at the category name adding section 112, the determined category name is added to the region or the image (step ST114).

As explained above, processing flow at the learning step and the classification step after learning has been explained. However, the learning type image classification program which is executed at each section is recorded on the recording medium 113.

(Second Embodiment)

Figure 4:
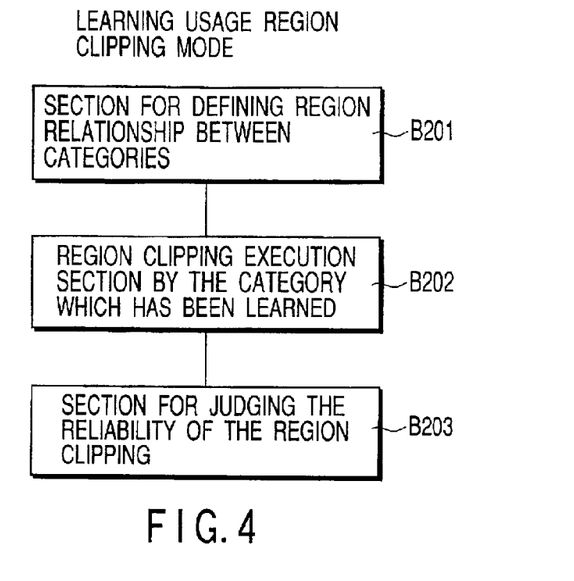
FIG. 4 is a block diagram showing a structure of a learning usage region clipping mode out of region clipping modes in the learning type image classification apparatus according to a second embodiment of the present invention.

FIG. 4 is a block diagram showing a structure of a learning usage region clipping mode out of the region clipping mode in the learning type image classification apparatus according to a second embodiment.

The structure of the second embodiment is the approximately similar to the structure of the first embodiment.

A main difference of the second embodiment from the first embodiment is that a reliability judging section B203 for judging the reliability of the clipping of the region for allowing the system to judge the reliability of the region clipped by the category which has been learned is provided in addition to the section B201 for defining the region relationship between categories and the region clipping execution section B202 by the category which has been learned.

For example, the reliability is represented in numeric values, so that the teacher data of an image having a high numeric value is used.

Otherwise, when the numeric value representing the reliability in the face detection in an image group selected by the user is low, the process proceeds to the semi-automatic clipping mode for clipping the region corresponding to the category in the image.

Consequently, in order to alleviate the work burden of the region clipping, it is possible to avoid a situation in which the precision of the region clipping has been deteriorated.

(Third Embodiment)

Figure 5:
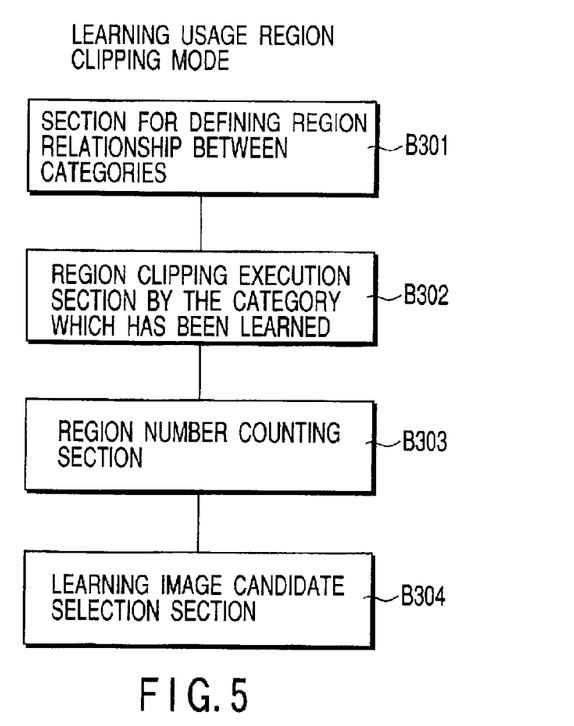
FIG. 5 is a block diagram showing a structure of a learning usage region clipping mode out of region clipping modes in the learning type image classification apparatus according to a third embodiment of the present invention.

FIG. 5 is a block diagram showing a structure of the learning usage region clipping mode out of the region clipping in the learning type image classification apparatus according to the third embodiment.

The structure of the third embodiment is approximately similar to the structure of the first embodiment.

A main difference of the third embodiment from the first embodiment is that a region number counting section B303 for counting the number of regions of the region clipping result by the category which has been learned and a learning image candidate selection section are provided in addition to the section B301 for defining a region relationship between categories and a region clipping execution section B302 by the category which has been learned.

For example, classification is made on the individual's face level, learning is conducted for classifying human face images from other scenery images in advance, the individual's face image region is clipped by using the clipping of this face region. In the case where a plurality of faces are photographed on one image, it is required for the user to designate which face region is about to be classified.

In the third embodiment, only in the case where the number of human face region is one, the face region is set as a candidate of the learning image.

As has been explained above, according to each of the embodiment of the present invention, there is provided a region clipping mode selection section, so that there is an advantage in that the burden of the clipping processing of the object region by man can be largely reduced at the learning step of the image classification.

In particular, according to the invention claimed in claim 10, a region clipping mode selection section is provided, so that the burden of the region clipping by the user is light, and, the region clipping mode having a favorable clipping performance can be selected with the result that there is an advantage in that the burden of the region clipping at the learning phase by the user without deteriorating the classification performance.

Furthermore, according to the present invention according to claim 15 described later, there is provided a reliability judging section for judging the reliability of the region clipping.

When the numeric value representing the reliability is low in the face detection in an image group selected by the user is low, the process proceeds to the semi-automatic clipping mode for clipping the region in the region corresponding to the category in the image.

Consequently, in order to alleviate the work burden of the region clipping, it is possible to avoid a situation in which the precision of the region clipping has been deteriorated.

Thus, the present invention has an advantage in that the classification precision can be improved.

Furthermore, according to the present invention claimed in claim 16 described later, there are provided a region number counting section, a teacher signal image candidate selection section with the result that there is an advantage in that man can omit the work of selecting and designating the object region from a plurality of regions by selecting only images having a region number 1 as a candidate of teacher images so that time wait problem up to the selection and designation can be avoided.

Incidentally, in each of the above embodiments, focus is placed on the clipping of regions at the learning step.

However, the present invention is not necessarily limited only to the clipping regions at the learning step.

That is, the present invention is particularly suitable to the learning step, but the present invention is not limited thereto.

Consequently, as has been explained above, according to the present invention, there can be provided a learning type image classification apparatus which is capable of clipping classification target regions at the learning phase and which is capable of alleviating manual work burden such as instruction of classification object regions, a method thereof and a recording medium 113 on which the processing program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A learning type image classification apparatus which classifies a plurality of images using a predetermined reference, said apparatus comprising:
a region clipping mode selection section which selects a mode of clipping a region from an image out of a plurality of candidates for clipping; and
a region clipping execution section for clipping; region from the image in the mode selected by the region clipping mode selection section.

2. The learning type image classification apparatus according to claim 1, wherein the apparatus is operated at least at a learning step and at a classification step after learning, and the region clipping mode selection section and the region clipping execution section are operated at the learning step.

3. The learning type image classification apparatus according to claim 1, wherein the candidates of image clipping mode include a mode of automatically dividing the image into a plurality of regions by using a change in color and luminance value and clipping from the image a region obtained by integrating regions selected from a plurality of these divided regions.

4. The learning type image classification apparatus according to claim 1, wherein the candidates of the mode of clipping the image include a mode of clipping a region by using the learned category.

5. The learning type image classification apparatus according to claim 4, wherein the mode of clipping the region judges the reliability of the region clipping by using the learned category.

6. The learning type image classification apparatus according to claim 4, wherein the mode of clipping the region counts the number of clipped regions by using the learned category, and the image having a region number of 1 is extracted as an image learning.

7. The learning type image classification apparatus according to claim 1, wherein the region clipping mode displays the result of the region clipping and the operator can make a selection as to whether the result of the region clipped is to be adopted.

8. The learning type image classification apparatus according to claim 1, wherein a feature of the region is extract for classifying an image including the region.

9. A learning type image classification method which classifies a plurality of images on a predetermined reference, said method comprising:
selecting a mode of clipping a region from an image out of a plurality of candidates for the mode of clipping; and
clipping the region from the image in the selected mode.

10. The learning type image classification method according to claim 9, further comprising extracting a feature of the region for classifying an image including the region.

11. A computer readable medium in which a processing program is recorded for classifying a plurality of images on a predetermined reference with a computer, the processing program comprising:
a first program providing a computer with a mode of clipping a region from the image selected from a plurality of candidates; and
a second program allowing the computer to clip a region from the image in the clipping mode,
wherein the first program and the second program constitute a learning type image classification program.

12. The learning type image classification medium according to claim 11, wherein a feature of the region is extracted for classifying an image including the region.

13. A learning type image classification apparatus provided with a learning step and a classification step after learning for classifying a plurality of images or automatically adding key words for retrieval to images, the apparatus comprising:
a learning step execution section for executing the learning step;
a classification step execution section after learning for executing the classification step after learning; and
a region clipping mode selection section provided with a plurality of region clipping modes, the section being capable of selecting several modes out of the plurality of the modes.

14. The learning type image classification apparatus according to claim 13, wherein the region clipping mode comprises a semi-automatic region clipping mode, a learning usage region clipping mode, and a interactive type region clipping mode.

15. The learning type image classification apparatus according to claim 14, wherein the semi-automatic region clipping mode comprises a region dividing section for automatically dividing the image into several regions by using the change in the color and luminance in the image;
a region designation section which is capable of designating a classification object region out of the regions divided at the region dividing section; and a region integration section for integrating the region designated with the region designation section to set the region as the clipped region.

16. The learning type image classification apparatus according to claim 14, wherein the learning usage region clipping mode comprises:
   a section for defining a region relationship between a category which has been learned and a category which is being learned; and
   a region clipping execution section by the category which has been learned for executing the region clipping by the category which has been learned.

17. The learning type image classification apparatus according to claim 14, wherein the interactive type region clipping mode comprises:
   a section for defining a region relationship between a category which has been learned and a category which is being learned;
   a region clipping execution section by the category which has been learned for executing region clipping by the category which has been learned;
   a region clipping result display section; and
   a judging section for judging the adoption of the region clipping.

18. The image classification apparatus according to claim 14, wherein, the learning usage region clipping mode further comprises a reliability judging section for judging the reliability of a region clipping wherein the system judges the reliability of the region clipping by the category which has been learned.

19. The image classification apparatus according to claim 14, wherein the learning usage clipping mode further comprises:
   a region number counting section for counting the number of regions of the result of the region clipping by the category which has been learned; and
   a learning image candidate selection section in which an image in which the number of regions is counted 1 is set as a candidate of the learning image.

20. The learning type image classification apparatus according to claim 13, wherein a feature of the region is extracted for classifying an image including the region.

21. A learning type image classification apparatus which classifies a plurality of images, said apparatus comprising:
   a region clipping mode selection section which selects a mode of clipping a region from an image out of a plurality of candidates for clipping; and
   a region clipping execution section for clipping the region from the image in the mode selected by the region clipping mode selection section.

22. the learning type image classification apparatus according to claim 17, wherein a feature of the region is extracted for classifying an image including the region.

* * * * *